(12) United States Patent
Fiss et al.

(10) Patent No.: US 12,237,554 B2  
(45) Date of Patent: Feb. 25, 2025

(54) CLAMPING AND HOLDING APPARATUS

(71) Applicant: ContiTech Deutschland GmbH, Hannover (DE)

(72) Inventors: Tim Fiss, Hannover (DE); Philipp Freiheit, Hannover (DE)

(73) Assignee: ContiTech Deutschland GmbH, Hannover (DE)

( * ) Notice: Subject to any disclaimer, the term of this patent is extended or adjusted under 35 U.S.C. 154(b) by 567 days.

(21) Appl. No.: 17/594,002

(22) PCT Filed: Feb. 25, 2020

(86) PCT No.: PCT/EP2020/054847  
§ 371 (c)(1),  
(2) Date: Sep. 29, 2021

(87) PCT Pub. No.: WO2020/200589  
PCT Pub. Date: Oct. 8, 2020

(65) Prior Publication Data  
US 2022/0166046 A1 May 26, 2022

(30) Foreign Application Priority Data  
Apr. 1, 2019 (DE) .................... 10 2019 204 529.4

(51) Int. Cl.  
*H01M 8/248* (2016.01)

(52) U.S. Cl.  
CPC .................................. *H01M 8/248* (2013.01)

(58) Field of Classification Search  
None  
See application file for complete search history.

(56) References Cited

U.S. PATENT DOCUMENTS

| | | | |
|---|---|---|---|
| 6,040,072 A * | 3/2000 | Murphy ............... | H01M 8/247 429/470 |
| 2006/0093890 A1* | 5/2006 | Steinbroner ......... | H01M 8/248 429/511 |

(Continued)

FOREIGN PATENT DOCUMENTS

| CA | 2908795 C | 10/2014 | |
|---|---|---|---|
| CN | 1585174 A * | 2/2005 | ............. H01M 8/02 |

(Continued)

OTHER PUBLICATIONS

Machine Translation of CN-1585174-A (Year: 2004).*  
Machine Translation of WO-2020026961-A1 (Year: 2020).*

*Primary Examiner* — Gregg Cantelmo  
(74) *Attorney, Agent, or Firm* — Gregory Adams; Richard Wolf

(57) ABSTRACT

A clamping and holding apparatus for an article (1) fixed under preload by at least one clamping means (4), preferably for a container of variable volume, the clamping and holding apparatus having a clamping frame or carrier (3) assigned to the article (1), and also a clamping device (5), assigned to the clamping frame or carrier (3), for the clamping means (4), the clamping frame or carrier (3) being provided with guide or directing devices (6) for the clamping means (4) and being able to be connected by said clamping means to the article so as to provide a preload force, the clamping means (4) being composed of at least one endless belt composed of elastomer material which wraps around the article and at least parts of the clamping frame or carrier (3) and the wraparound length of which is variable by means of the clamping device (5).

7 Claims, 5 Drawing Sheets

(56) References Cited

U.S. PATENT DOCUMENTS

Figure 1:
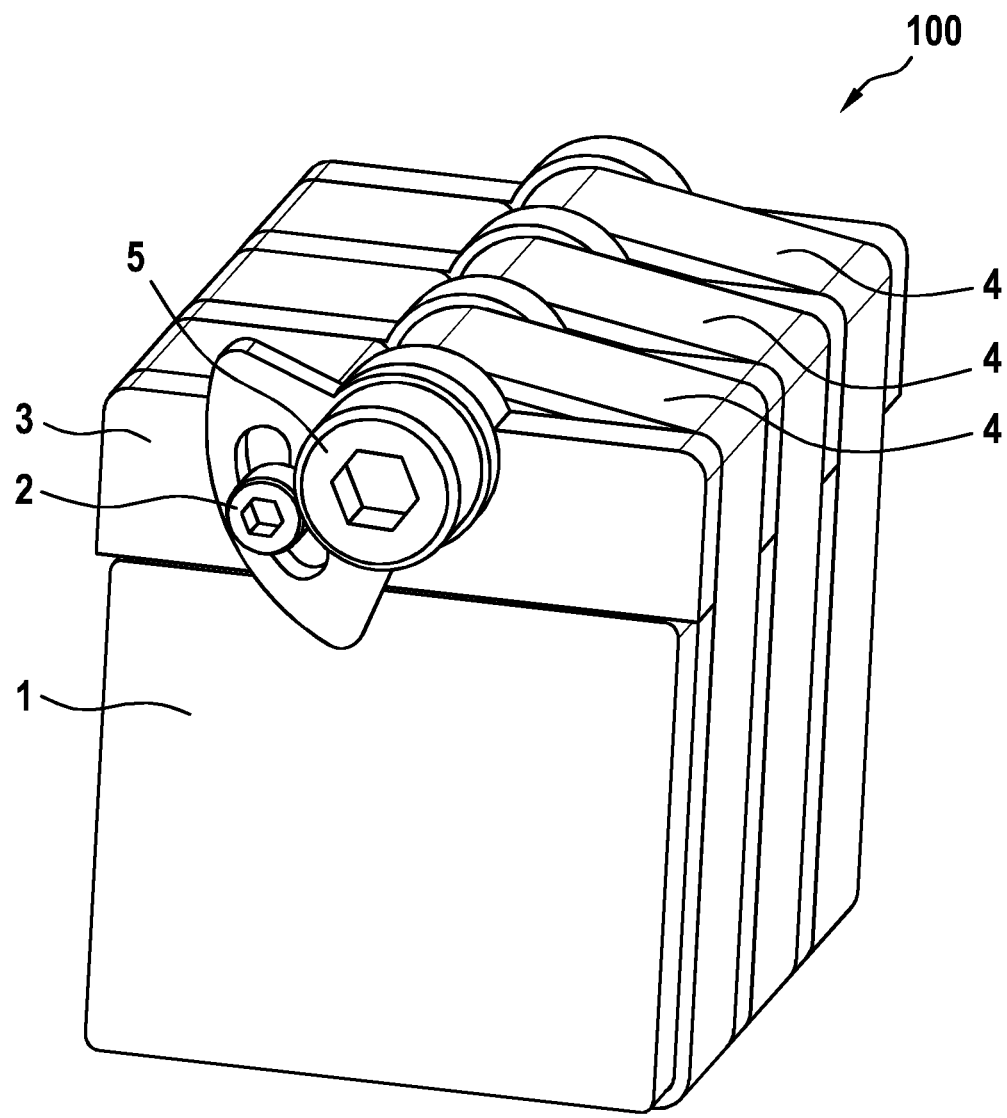

2016/0240881 A1* 8/2016 Sang .................... H01M 8/248
2023/0335773 A1* 10/2023 Ochs .................... H01M 8/248

FOREIGN PATENT DOCUMENTS

| CN | 108346814 A | 7/2018 |
| DE | 1938563 U | 1/1970 |
| DE | 102006059977 A1 | 6/2008 |
| DE | 202013003672 U1 | 7/2014 |
| WO | WO-2020026961 A1 * | 2/2020 |

* cited by examiner

CLAMPING AND HOLDING APPARATUS

The invention relates to a clamping and holding apparatus for an article fixed under preload by at least one clamping means, preferably for a container of variable volume.

Clamping devices for securely clamping any desired article, such as for example an article of variable volume in the form of a tank or container, are known. For example, DE 10 2006 059977 A1 discloses a profile base for a clamping element of a fuel tank, said profile base being intended to prevent the transmission of vibrations from the body and to allow a certain change in volume.

For relatively heavy articles which are subjected to strong forces, clamping devices are required that are suitable for high preload forces in the range of several kilonewtons per clamping element. Such clamping elements should on the one hand offer a high level of security against breakage or tearing, but on the other hand allow, through resilient properties, a not inconsiderable positive as well as negative expansion travel of the clamped element, without thereby leaving a permitted tolerance band of the clamping force. To date, only clamping elements in the form of steel bands are known for such applications, which are optionally acted upon by steel spring assemblies.

The object of the invention was therefore to provide a clamping and holding apparatus in which the steel bands, which have intrinsically little extensibility, and expensive steel spring assemblies can be dispensed with. In addition, the object was to achieve advantages in terms of installation space, dead weight and costs with an at least comparable resilient clamping action on the element to be clamped.

This object is achieved by the features of the main claim. Further advantageous embodiments are disclosed in the dependent claims.

In this case, the clamping and holding apparatus has a clamping frame or carrier assigned to the article, and also a clamping device, assigned to the clamping frame or carrier, for the clamping means, the clamping frame or carrier being provided with guide or directing devices for the clamping means and being able to be connected by said clamping means to the article so as to provide a preload force, the clamping means being composed of at least one endless belt composed of elastomer material which wraps around the article and at least parts of the clamping frame or carrier and the wraparound length of which is variable by means of the clamping device.

Up to now, there has been the widespread view in the prior art that it would be unsuitable to use an endless belt composed of elastomer material as a clamping element, in particular on account of problems during assembly and during application of clamping forces. This is because such a belt cannot be stretched and pushed over the element to be clamped without considerable complications. There are also problems in setting the desired preload force precisely via the geometric interaction of the element to be clamped and the clamping belt.

The design according to the invention solves this in that, on the one hand, the elastic clamping action of a conventional belt is used to compensate for changes in volume of the element to be clamped and the latter is still kept under preload, wherein, on the other hand, a clamping device for the clamping means or the endless belt is provided, which varies the original wraparound length of the clamping means configured in the form of an endless belt.

In this case, such a clamping device or a clamping lock achieves the task of assembly in such a way that the clamping belt can firstly be placed, in a slack and preload-free manner, with an excess length around the element to be clamped, that is to say the article, before the clamping device shortens the effective length, that is to say the wraparound length, of the clamping belt and thus applies the desired preload. Furthermore, the preload can be set precisely, for example via the applied torque on a clamping device that is clampable by rotation, as explained further below. Thus, independently of manufacturing fluctuations or geometrical and physical tolerances of the clamping means or belt, a precisely adjustable, uniform clamping force is always provided.

An advantageous development consists in that the clamping means is configured in the form of an endless drive belt with tension members extending in its longitudinal direction, preferably in the form of a flat belt. Such drive belts, and in particular flat belts, can be attached to the article to be clamped in a simple manner and can be produced with their length geared toward this. There is thus also the possibility of using conventional standard parts.

A further advantageous embodiment consists in that a plurality of clamping means which lie next to one another and the wraparound length of which is variable by means of the clamping device are provided. Such an embodiment makes it possible to realize relatively large clamping forces and also achieve a uniform distribution of force and pressure in relation to the article surface.

A further advantageous embodiment that is particularly easy to implement and produce consists in that the clamping device is configured in the form of a rotary knob.

A further advantageous embodiment consists in that the rotary knob is configured in the form of a fork which is mounted in the clamping device so as to be rotatable about an axis oriented perpendicularly with respect to the longitudinal axis of: the clamping means and which encompasses the clamping means in such a way that during rotation of the fork, the clamping means is wound up and its wraparound length can be reduced. This achieves a knob effect that can be implemented in a particularly space-saving manner. In this case, the clamping means configured in the form of a drive belt is encompassed or surrounded by at least two fork prongs in a simple manner and its wraparound length can thus easily be shortened by a rotation about the longitudinal axis of the knob, as can also be seen in the exemplary embodiments described further below.

A further advantageous embodiment consists in that a predetermined torque can be applied to the rotary knob. With such a predetermination, overrotation of the clamping device or of the clamping means, and also a clamping means that is placed too loosely or with too much slack around the article to be clamped, is avoided.

A further advantageous embodiment consists in that the clamping device is provided with a fixing device, with the aid of which the position of the clamping device can be fixed after a certain preload or a certain angle of rotation has been reached. For example, in the case of a rotary knob, this can be done by a screw guided in a rotary slot.

A further advantageous embodiment consists in that the clamping device for the clamping means is configured such that the article is connectable to the clamping frame or carrier so as to provide a resiliently supported preload force. Such an embodiment ensures that there is no overloading of the clamping means and that there is nevertheless always a sufficiently dimensioned preload force.

A particularly advantageous application of the clamping and holding apparatus according to the invention results from its use in a fuel cell fixed under preload by at least one clamping means, preferably a fuel cell pack made up of individual fuel cells connected to one another in a modular manner. The advantages in terms of small installation space, low weight and easy interchangeability come to bear to a particular extent here.

Figure 2:
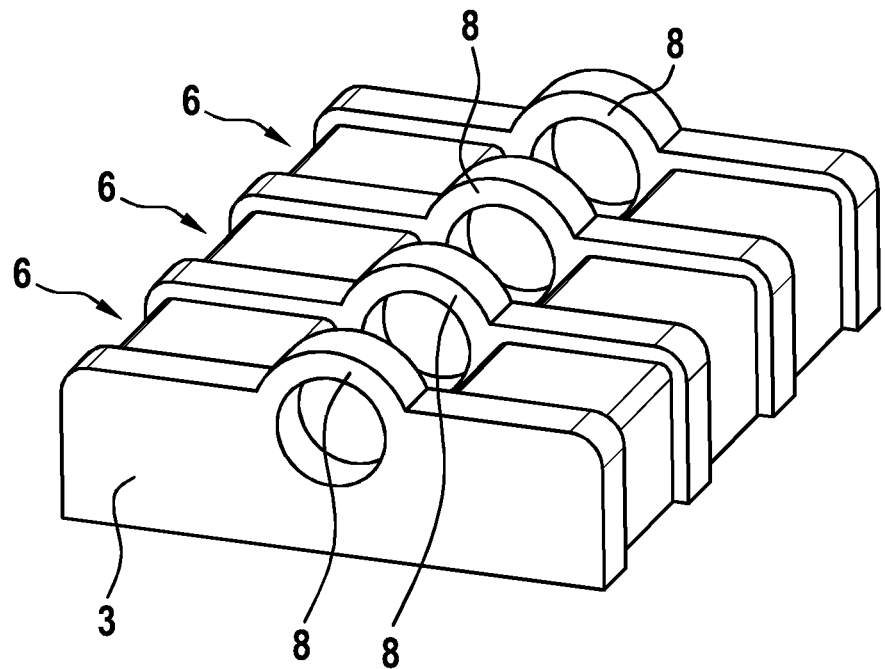
Figure 3:
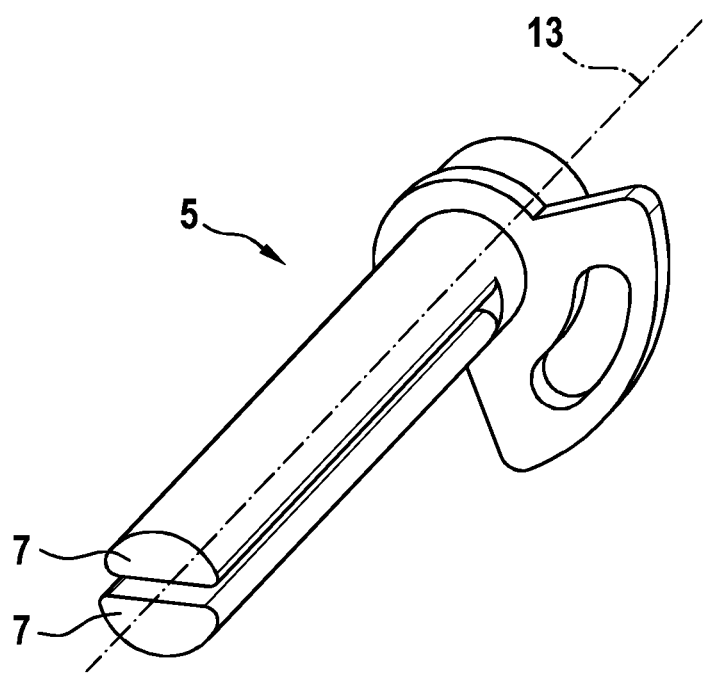
Figure 4:
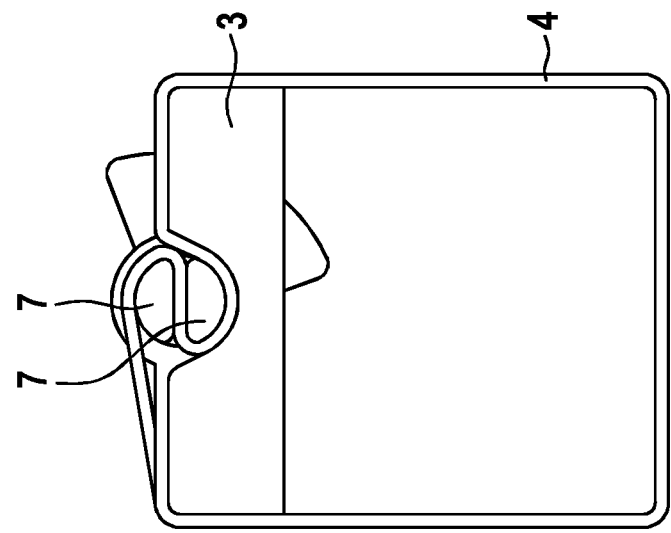
Figure 4:
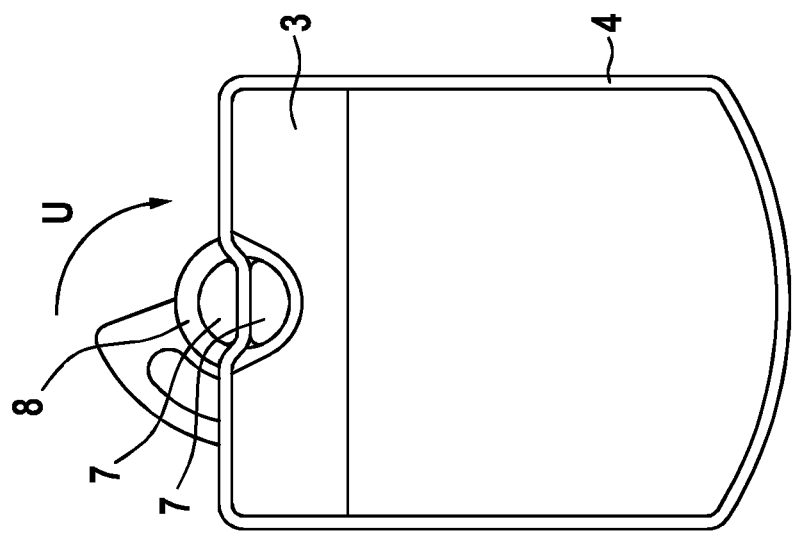
Figure 5:
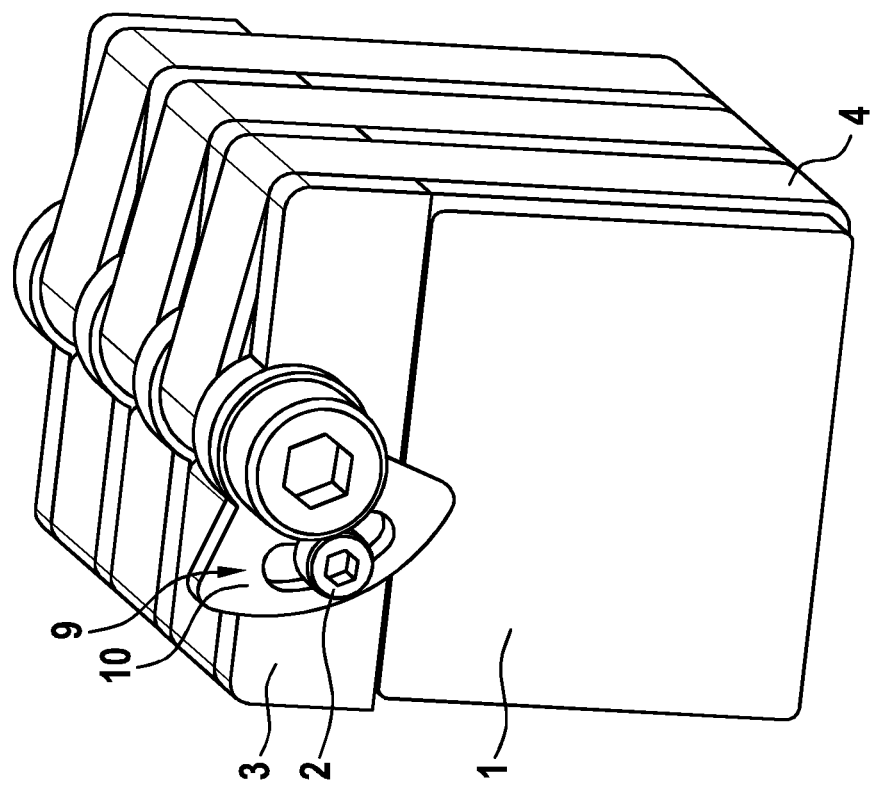
Figure 5:
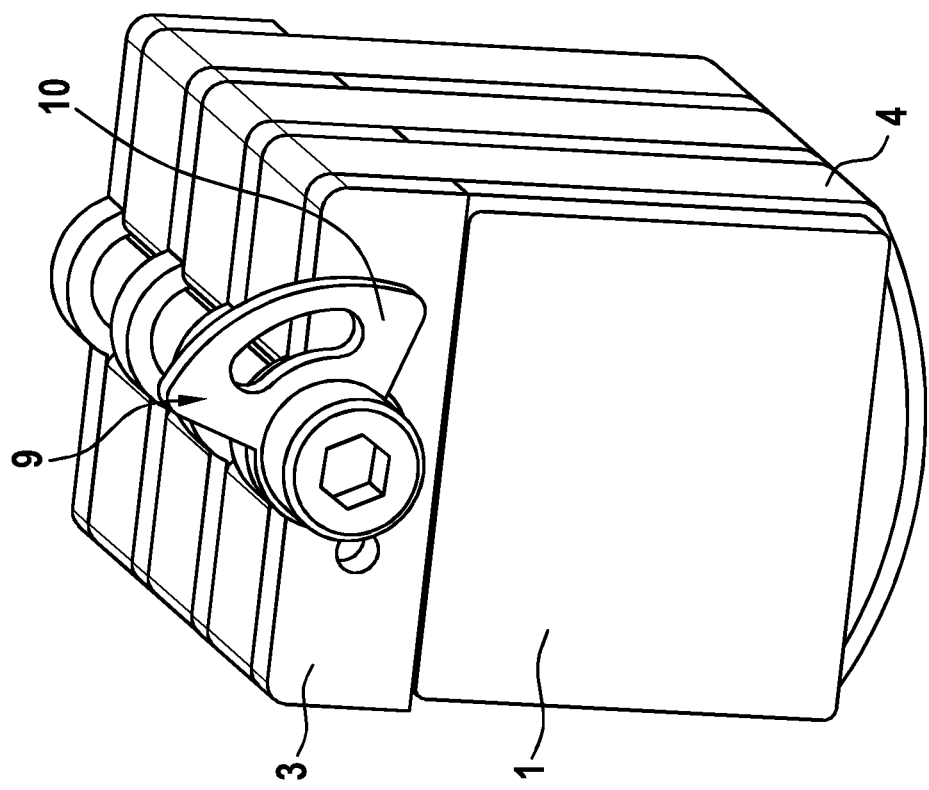
Figure 6:
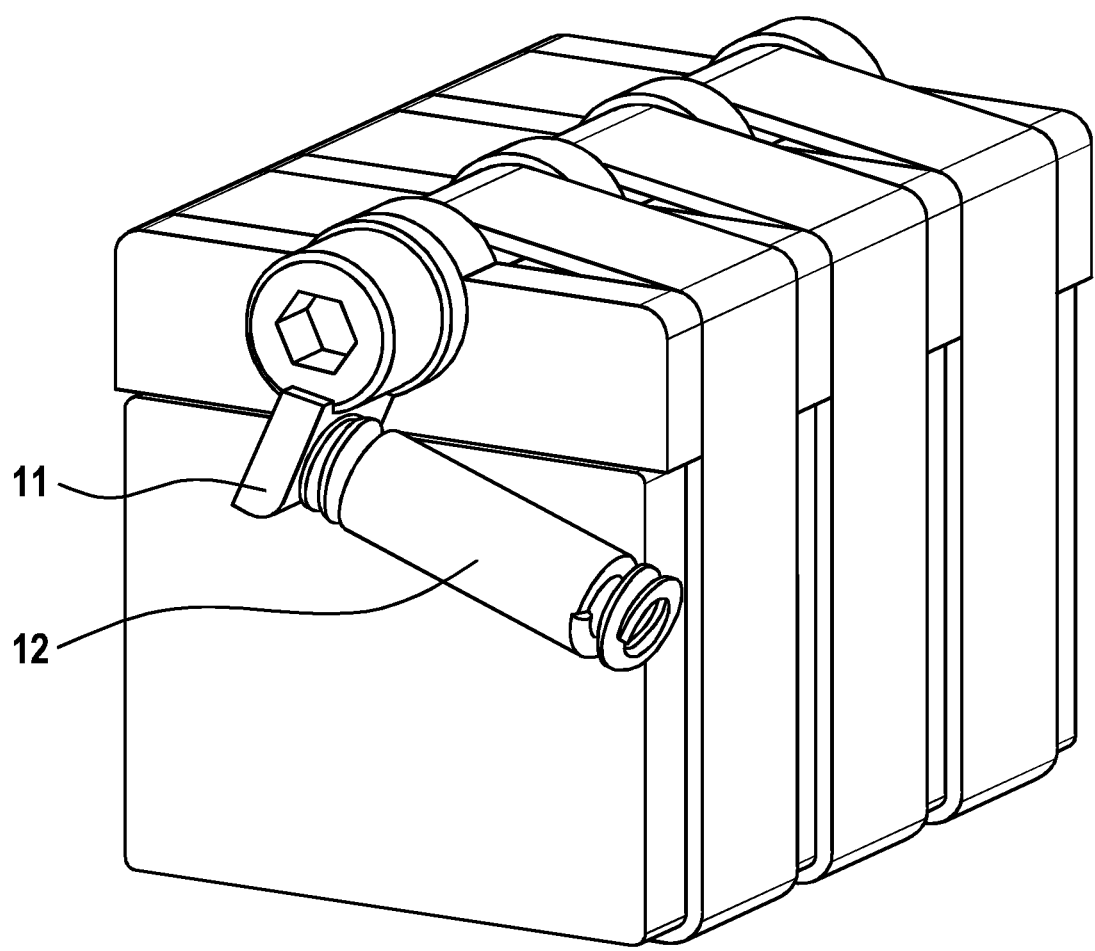

The invention will be explained in more detail on the basis of an exemplary embodiment. In the figures:

FIG. 1 shows a clamping and holding apparatus according to the invention for a fuel cell pack fixed by a plurality of clamping means, FIG. 2 shows the clamping frame or carrier shown in FIG. 1 in detail, FIG. 3 shows the clamping device configured in the form of a rotary knob shown in FIG. 1 in detail, FIG. 4 shows the functioning of the clamping and holding apparatus according to the invention by comparing the non-clamped state with the clamped state, FIG. 5 shows the functioning when fixing the stress state of the clamping and holding apparatus according to the invention, also by comparing the non-clamped state with the clamped state, FIG. 6 shows a further embodiment of a clamping and holding apparatus according to the invention, in which the clamping device is acted upon by a spring assembly.

FIG. 1 shows a clamping and holding apparatus 100 according to the invention for a fuel cell pack 1 fixed under preload by a plurality of clamping means 4 in the clamped state. The fuel cell pack is composed of a plurality of fuel cells that are connectable to one another in a modular manner.

The clamping and holding apparatus has a clamping frame or carrier 3 assigned to the fuel cell pack 1, and also a clamping device 5, assigned to the clamping frame or carrier, for the clamping means 4, a plurality of clamping means 4 being provided in this embodiment, namely three endless, closed, commercially available flat belts with tension members extending in their respective longitudinal direction. The tension members are not illustrated in any more detail here. In this embodiment, each of the clamping means 4 is provided for a fuel cells connected to one another in a modular manner.

The clamping frame or carrier 3 is shown again in detail in FIG. 2. The clamping frame or carrier is provided with guide or directing devices 6 for the clamping means 4, which are configured in the form of flat belts, and is shaped such that the article, here the fuel cell pack 1 or the individual fuel cells connected to one another in a modular manner, can be inserted into the clamping frame or carrier 3 by way of its upper part/upper region and then the fuel cell pack 1 is fixed on or in the clamping frame or carrier 3 by means of the preload force.

The volume-variable fuel cell pack 1 to be clamped is thus held under preload on its upper side by the clamping frame or carrier 3 and in all other directions by the three clamping means 4 configured in the form of flat belts. Changes in volume are accommodated by the elastic elongation of the clamping means 4 configured in the form of flat belts along their spring characteristic curves.

Here, the flat belts are composed of coiled strength members which are embedded in an elastomer matrix, here in ethylene propylene diene elastomer (EPDM), in order to meet all requirements with regard to the temperature loads and elasticity requirements for a fuel cell pack.

For the simplified assembly of the clamping means 4 configured in the form of flat belts, these are placed in non-clamped form over the clamping frame or carrier 3 into the cutouts or guide or directing devices 6 provided for this purpose. The clamping frame or carrier 3 rests in this case on the fuel cell pack 1 to be clamped or on the individual fuel cells connected to one another in a modular manner, while the clamping means 4, which are configured with a corresponding length, are simply pushed over both components. The clamping means 4 configured in the form of flat belts then wrap around the fuel cell pack 1 and the clamping frame or carrier 3. Their respective wraparound length is variable by means of the clamping device 5.

The clamping device 5, configured here in the form of a rotary knob, is shown again in detail in FIG. 3. The clamping device configured in the form of a rotary knob is mounted so as to be rotatable about an axis 13 oriented perpendicularly with respect to the longitudinal axis of the clamping means/flat belts and is configured over part of its length in the form of a fork 7 which encompasses the clamping means. During rotation of the rotary knob/of the clamping device 5, and thus during rotation of the fork 7, the clamping means 4 configured in the form of flat belts are "wound up" and their respective wraparound lengths are reduced.

This is illustrated in principle in FIG. 4. FIG. 4 shows, on its left-hand side, the original state prior to clamping of the flat belts and, on the right-hand side, the state after half a revolution U of the rotary knob and after clamping of the flat belts.

The clamping device 5, which is designed as a fork configured over part of its length in the form of a fork 7, is in this case guided through the eyes 8 of the clamping frame or carrier 3 and mounted there.

FIG. 5 also shows, on its left-hand side, a fuel cell pack 1 with attached clamping frame or carrier 3 in the original state prior to clamping of the flat belts and, on the right-hand side, the state after about half a revolution of the rotary knob and after clamping of the flat belts. It can also be clearly seen here that the clamped flat belts are fixed in the clamped state by the screw 2 with the aid of the clamping device 5 designed as a fork. As already illustrated above, this takes place in that the screw 2 engaging in the clamping frame or carrier 3 is guided through a rotary slot 9 which is provided in a flange 10 belonging to the clamping device 5. As soon as the screw is tightened, the braced position of the clamping device 5 is fixed. The clamping frame or carrier 3 here comprises the fuel cell pack 1 or the individual fuel cells 1 connected to one another in a modular manner, at least in part, namely the respective upper part of the fuel cell pack 1/of the individual fuel cells connected to one another in a modular manner.

FIG. 6 shows a further embodiment of a clamping and holding apparatus in which a flange 11 belonging to the clamping device 5 is acted upon by a spring assembly 12. In this embodiment, the clamping device 5 which is rotated through 180° is not locked in a fixed position by a screw, but is supported in a floating manner by a helical spring. This has the advantage that only the elastic flat belts 4 compensate for the change in volume in the case of small changes in volume, but in the case of relatively large changes, as soon as in particular the frictional forces of the clamping device 5 are exceeded, the spring characteristic curve of the preloaded helical spring, plate spring or bow spring additionally comes into effect and greater travels can be compensated with relatively small changes in force.

LIST OF REFERENCE DESIGNATIONS

Part of the Description

1 Fuel cell pack
2. Screw

3 Clamping frame or carrier
4 Clamping means
5 Clamping device
6 Guide or directing device
7 Fork
8 Eye of the clamping frame or carrier
9 Rotary slot
10 Flange
11 Flange
12 Spring assembly
13 Axis

The invention claimed is:
1. A clamping and holding apparatus comprising:
a clamping frame assigned to an article, and also a clamping device, assigned to the clamping frame, the clamping frame or carrier being provided with a guide device for a belt to provide a preload force;
the belt being composed of an elastomer material which wraps around the article and at least parts of the clamping frame and a wraparound length of which is variable by the clamping device;
wherein the clamping device is a rotary knob; and,
wherein the rotary knob is configured in the form of a fork which is mounted in the clamping device to be rotatable about an axis oriented perpendicularly with respect to the longitudinal axis of the clamping means and which encompasses the belt that during rotation of the fork, the belt is wound up and its wraparound length is reduced.

2. The clamping and holding apparatus as claimed in claim 1, further comprising a plurality of belts lie next to one another and the wraparound length of which is variable by the clamping device.

3. The clamping and holding apparatus as claimed in claim 1, wherein a predetermined torque can be applied to the rotary knob.

4. The clamping and holding apparatus as claimed in claim 1, wherein the clamping device is provided with a fixing device.

5. The clamping and holding apparatus as claimed in claim 1, wherein the clamping device is configured that the article is connectable to the clamping frame to provide a resiliently supported preload force.

6. The clamping and holding apparatus as claimed in claim 1, wherein the clamping frame encompasses the article.

7. An apparatus for holding a fuel cell pack, the apparatus comprising:
a clamping frame having a plurality of flat belts wrapped around the clamping frame;
a rotatable clamping device coupled to the clamping frame that adjusts a wrapping length of the plurality of flat belts;
a tensioning screw of the rotatable clamping device, the tensioning screw to adjust tensioning of the plurality of belts; and
wherein the rotatable clamping device is rotatable to an original state before tensioning and a tensioning state after tensioning the plurality of flat belts.

* * * * *